United States Patent [19]
Green et al.

[11] 3,939,477
[45] Feb. 17, 1976

[54] QUADRUPOLE ADCOCK DIRECTION FINDER AND ANTENNA THEREFOR
[75] Inventors: Terence C. Green; William G. Guion; Douglas N. Travers; William M. Sherrill, all of San Antonio, Tex.
[73] Assignee: Southwest Research Institute, San Antonio, Tex.
[22] Filed: Apr. 6, 1973
[21] Appl. No.: 348,479

[52] U.S. Cl......... 343/113 R; 343/100 PE; 343/119
[51] Int. Cl.² ............................................. G01S 5/04
[58] Field of Search........ 343/113 R, 119, 124, 799, 343/800, 100 PE

[56] References Cited
UNITED STATES PATENTS

| | | | |
|---|---|---|---|
| 2,953,782 | 9/1960 | Byatt | 343/124 |
| 3,329,954 | 7/1967 | Travers | 343/113 R |
| 3,490,024 | 1/1970 | Sherrill et al. | 343/113 R |
| 3,727,227 | 4/1973 | Takao et al. | 343/113 R |
| 3,824,596 | 7/1974 | Guion et al. | 343/119 |

FOREIGN PATENTS OR APPLICATIONS

| | | | |
|---|---|---|---|
| 591,867 | 9/1947 | United Kingdom | 343/119 |

OTHER PUBLICATIONS

Terman, Electronic and Radio Engineering, 4th Ed., 1955, pp. 1050–1051.
Evans; "IRE Transactions on Antennas & Propagation"; Nov., 1962; pp. 686–691.

Primary Examiner—T. H. Tubbesing
Assistant Examiner—S. C. Buczinski
Attorney, Agent, or Firm—Donald Gunn

[57] ABSTRACT

A plurality of dipoles is arranged and connected to form a quadrupole Adcock Antenna system which is connected with direction finding circuitry to define a direction finder system of which two embodiments are disclosed. The system responds to any transmitter to be located.

39 Claims, 14 Drawing Figures

U.S. Patent  Feb. 17, 1976  Sheet 1 of 4  3,939,477
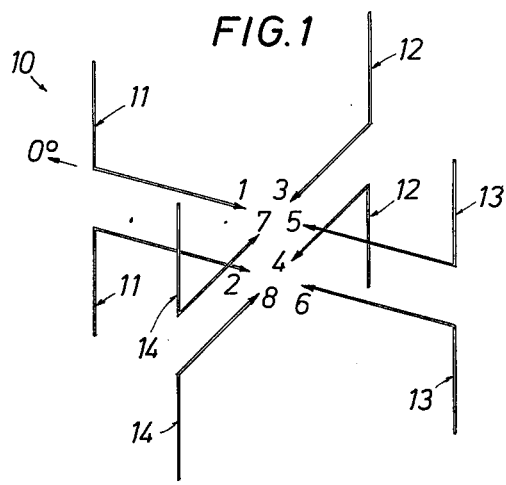
FIG. 1
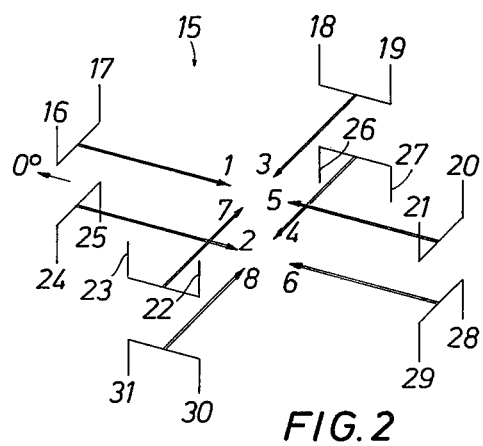
FIG. 2
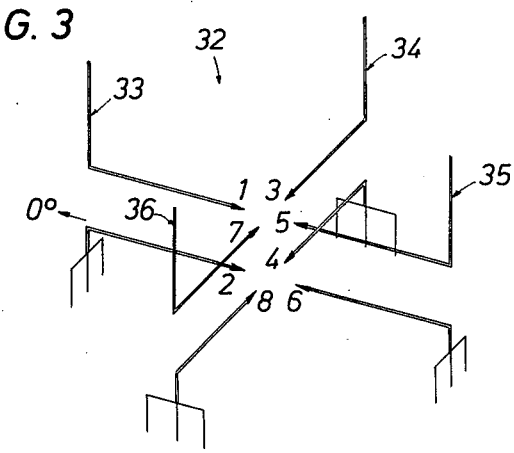
FIG. 3
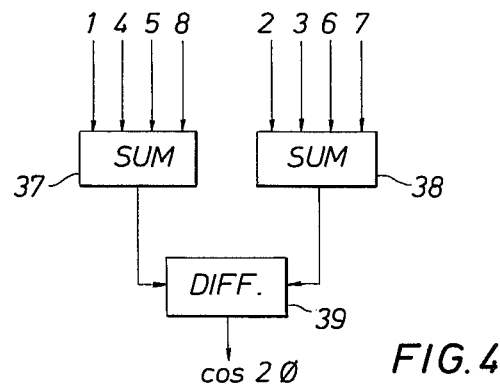
FIG. 4
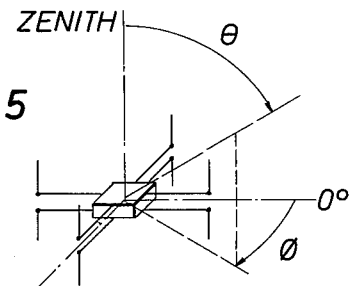
FIG. 5
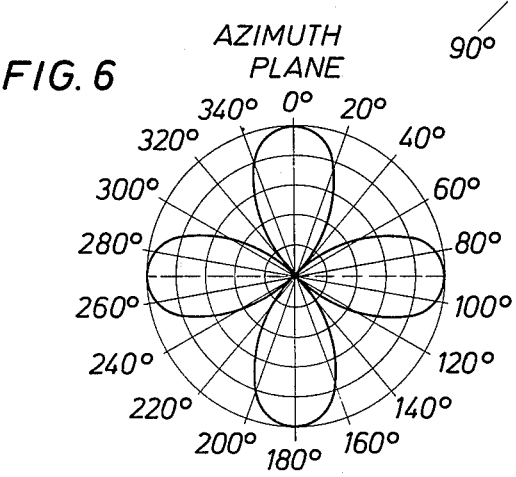
FIG. 6
FIG. 7

QUADRUPOLE ADCOCK DIRECTION FINDER AND ANTENNA THEREFOR

PRIOR ART

British Pat. No. 130,490, Adcock, Frank, Aug. 7, 1919.

Breuninger, H, W., "The Limits of Usefulness of the Adcock Direction Finder with 'N' Masts", Hoch: tech. u. Elek: akus, vol. 59, pp. 50–57, February, 1942.

Redgment, P. G. Struszynski, W., and Phillips, G. J., "An Analysis of the Performance of Multi-Aerial Adcock Direction-Finding System," JIEE, vol. 94, IIIA, pp. 751–756, March, 1947.

British Pat. No. 498,417, Wagstaffe, C.F.A., July 1937.

British patent application No. 29088/45, Wright, Sir C. S., Redgment, P. G., and Rocke, A. F. L.

SUMMARY OF THE INVENTION

The invention herein described was made in the course of a contract with the Department of the Navy.

In direction finding systems, the quality of data is in large part dependent on the DF antenna characteristics, i.e. pattern quality, apertures, directivity, and so on. Antenna patterns suitable for direction finding purposes are easily obtained in theory, but practical problems arise which degrade the antenna pattern theoretically given. For example, the antenna may be located near objects which cause re-radiation. Other problems may arise in the implementation of a direction finding system. The Adcock antenna is particularly advantageous for use in a direction finding system. The Adcock antenna was first introduced in 1919, and has been substantially perfected since that time. This original Adcock antenna has an azimuthal response to vertical polarization which is characterized by two nulls, separated 180° from each other. The present invention has four nulls in the azimuthal response to vertical polarization which are separated 90° one from another. This property gives the present invention the name "Quadrupole Adcock". The original Adcock shall be distinguished as "Dipole Adcock".

The present invention and the dipole Adcock have similar properties which lead the present invention to likewise be named Adcock. They are the use of dipole elements and insensitivity to horizontally polarized radiation.

The quadrupole Adcock antenna system which is formed of a plurality of appropriately connected invididual dipole elements is particularly advantageous over many DF antenna systems such as those utilizing loop elements. The polarization of the incident signal may vary significantly dependent on the transmitter to the receiving antenna. Direction finding antennas using loop elements have antenna patterns which vary with the incident signal polarization. By contrast, the quadrupole Adcock antenna pattern on the other hand is polarization independent at least to the degree provided in the conventional dipole Adcock.

The quadrupole Adcock antenna system of the present invention preferably utilizes a number of dipole elements. The summations required by the interconnection of various dipole elements can be utilized to obtain sine $2\phi$ or cosine $2\phi$ azimuth response data for use in a direction finding system.

DESCRIPTION OF THE DRAWINGS

FIG. 1 is a perspective view of a first arrangement of dipole elements in a quadrupole Adcock antenna pattern arrangement;

FIG. 2 is a perspective view of a second arrangement using twice the number of elements, thus obtaining reduced spacing error at high frequencies;

FIG. 3 is a perspective view of an antenna arrangement that can be on a ground plane;

FIG. 4 schematically shows the manner in which the elements of FIG. 1, FIG. 2, and FIG. 3 are interconnected;

FIG. 5 defines the azimuth and incidence angles;

FIG. 6 shows the azimuthal antenna pattern of a quadrupole Adcock antenna system;

FIG. 7 shows the incidence plane of the antenna pattern of a quadrupole Adcock antenna system;

DESCRIPTION OF THE PREFERRED EMBODIMENTS

Figure 8:
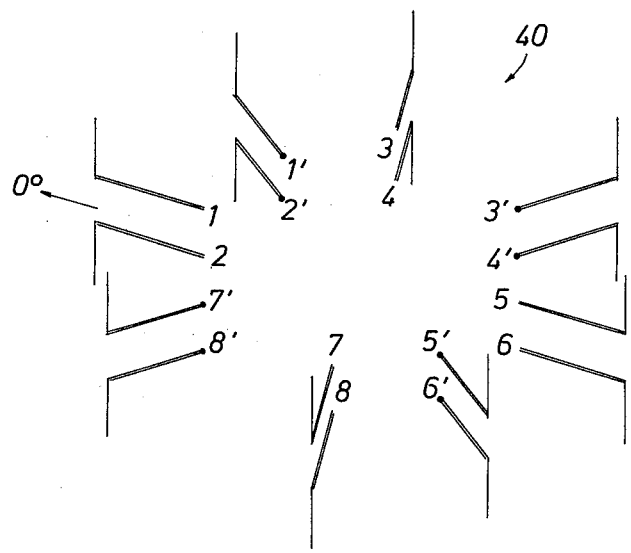
FIG. 8 illustrates a quadrupole Adcock antenna system providing both sine $2\phi$ and cosine $2\phi$ outputs.

Attention is first directed to FIG. 1 showing a quadrupole Adcock antenna system 10 formed of a plurality of vertically oriented dipole elements. Four vertically arranged dipole elements are split and connected in the manner of the quadrupole Adcock antenna system. The preferred locations of the dipole elements 11, 12, 13 and 14 are at the four points of an imaginary square in the horizontal plane. The eight outputs 1 through 8 of the four split dipoles are then combined in the manner shown in FIG. 4.

In FIG. 2 a quadrupole Adcock antenna system 15 is formed of eight vertical dipole elements. The upper halves 16, 17, 18, 19, 20, 21, 22, 23 of the eight dipoles are connected together in pairs 16 and 17, 18 and 19, 20 and 21, 22 and 23 (preferably spaced 90° apart in azimuth) as are the lower halves 24 and 25, 26 and 27, 28 and 29, 30 and 31. The eight outputs are also combined in the manner shown in FIG. 4. The eight element quadrupole Adcock has the advantage of reduced spacing error at the high frequency end of the spectrum which is of interest for the antenna.

The arrangement of FIG. 3 illustrates the implementation of a quadrupole Adcock 32 on or relative to the earth or other ground plane. This arrangement employs four vertical antenna elements 33, 34, 35 and 36. The image elements seen in the ground plane are connected to the horizontal conductors. The horizontal conductors provide the necessary symmetry to cancel the pick up of the horizontal component of the incident radiation. The preferred locations of the four vertical elements are again at the four points of an imaginary square in the horizontal plane. The eight outputs are also combined in the manner shown in FIG. 4. The antenna system of FIG. 3 is advantageous in that the vertical elements are reduced in height by one-half.

In FIG. 4, the eight conductors are grouped so that two groups of four each are summed together by the circuit means 37 and 38, typically through isolation transformers. A difference circuit 39 is provided with the output signals from the circuits 37 and 38 and forms an output which is a function of the azimuth of the target, or more specifically, the function cosine $2\phi$. As desired, the isolation transformers can have a one-to-one ratio, or any other ratio deemed appropriate.

The antenna systems of FIGS. 1, 2 and 3 combined with the combining means of FIG. 4 respond only to the vertically polarized components of the received signals. Incident radiation horizontally polarized does not provide an output response. The output signal of the antenna 10 or 15 is given by the Equation 1:

$$e \propto E_v \sin^3 \theta \cos 2\phi \qquad (1)$$

Where
$\theta$ = Incidence angle, graphically defined in FIG. 5.
$\phi$ = Azimuth angle, graphically defined in FIG. 5.
$E_v$ = Vertically polarized portion of incident radiation.

As observed in Equation 1, the quadrupole Adcock antenna system has a large, deep null for high angle ($\theta$ approaching 0°) incident signals.

The quadrupole azimuthal response of the antenna systems is limited in upper frequency by the relative spacing of the individual dipole elements in comparison with the incident signal wave length. The low end of the frequency band width in the quadrupole Adcock antenna system is determined in practice only by the degree to which appropriate design principles can be adhered to.

Attention is next directed to FIGS. 6 and 7 jointly which illustrate the azimuth response of the antenna system of the present invention to the vertically polarized components of the incident signals. The response to horizontally polarized radiation is theoretically zero, and is so small as to be insignificant in all regards.

FIG. 8 shows two quadrupole Adcock antenna systems grouped together. An arrangement of eight dipole elements which forms two quadrupole Adcock antenna systems spaced from one another by 45° is shown. On viewing the antenna system 40, there are eight individual dipole elements which are vertically arranged about a central axis. The referenced azimuth direction of 0° is indicated, and one dipole is located at that azimuth. Additional dipole elements are located every 45° around the circle and relative to a central reference axis. The antenna system provides sixteen conductors grouped in four groups of four. The four groups of conductors are supplied to summing circuits 41, 42 43 and 44 shown in FIG. 9. The summing circuits 41 and 42 are connected to a difference circuit 45. The summing circuits 43 and 44 are connected to a similar difference circuit 46. The difference circuit 45 provides an output signal which is a function of cosine $2\phi$ while the difference circuit 46 provides an output signal which is a function of sine $2\phi$.

Figure 10:
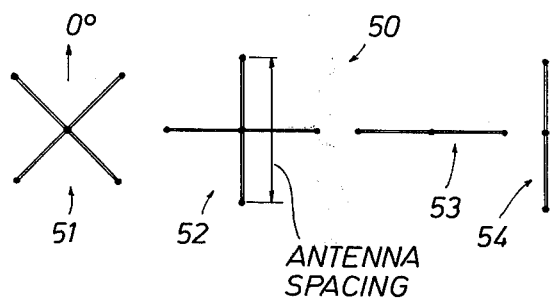
FIG. 10 schematically represents a plan view of quadrupole and dipole Adcock antennas arranged for use in a direction finder system.

Attention is directed to FIG. 10 which schematically represents four antennas 50. The four antennas preferably utilize two quadrupole Adcock systems 51, 52 as taught by the present invention and two dipole Adcock antennas 53, 54. The quadrupole Adcocks are symbolically represented in FIG. 10, rotated from one another by 45° so as to respond to the sine and cosine of twice the azimuth angle of the target. Dipole Adcocks provide output signals which are a function of the sine and cosine of the azimuth angle, not the double angle as in the case for the quadrupole systems. The central dot on the antenna elements represent the electrical phase center, which normally coincides with the physical center. The combination of the quadrupole and dipole Adcock antennas can be arranged for direction finding purposes in the following configurations:

1. Electrical phase centers arranged coaxially along a vertical axis. The quadrupole Adcock antenna element centers can be coplanar (as shown in FIG. 8) and separated along the vertical axis from the dipole Adcock element centers which can also be coplanar.

2. With a common electrical phase center, where all antenna element centers are coplanar.

3. Arranged with a separation of quadrupole Adcock and dipole Adcock electrical phase centers. The coplanar arrangement of quadrupole Adcock antennas can be separated in the horizontal plane from the coplanar dipole Adcock antennas.

4. A combination of configurations 1 and 3 to provide separation of the quadrupole and dipole Adcock electrical phase centers in any direction.

5. Arranged with a separation of each functional antenna (i.e. sin $2\phi$, cos $2\phi$, sin $\phi$, and cos $\phi$) electrical phase center in any direction.

Configurations 1 and 2 above are the preferred embodiment providing the simplest direction finding application and solution. Configurations 3, 4, and 5 may be required when siting constraints or different direction finding parameters are required. The four antennas 50 are all passive in the sense that they respond to any transmitted signal from a target of interest. They can be used, for example, to respond to voice transmissions from an aircraft pilot requesting landing instructions from a control facility. The antenna system 50 responds to the transmitted signal and forms output signals which are a function of the antenna field patterns of the four antenna elements 50. This can be used in the direction finding systems to be described hereinafter.

Figure 11:
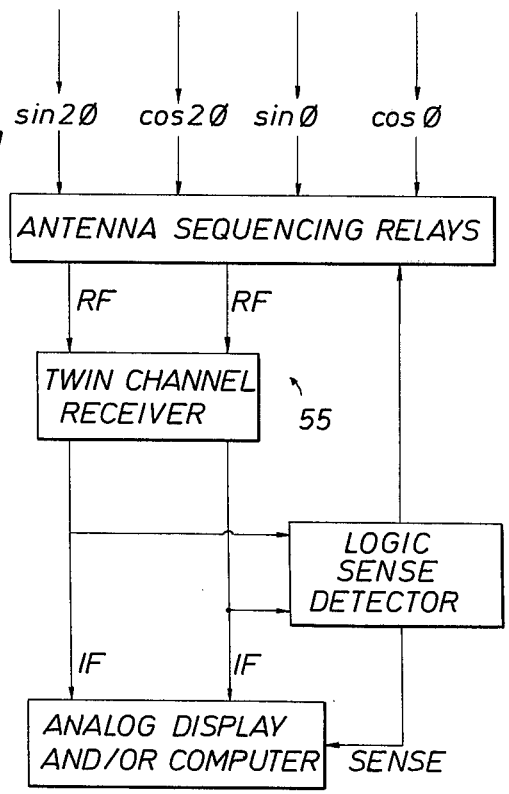
FIG. 11 is a schematic block diagram of a direction finding system utilizing the antenna system of FIG. 10.

Attention is next directed to FIG. 11 where a first direction finding system 55 is shown. The dual channel direction finding system 55 is greater in detail in co-pending patent application Ser. No. 292,533, assigned to a common assignee of the present invention, and which is incorporated by reference as a disclosure of a passive direction finding system which uses quadrupole and dipole antennas.

Figure 12:
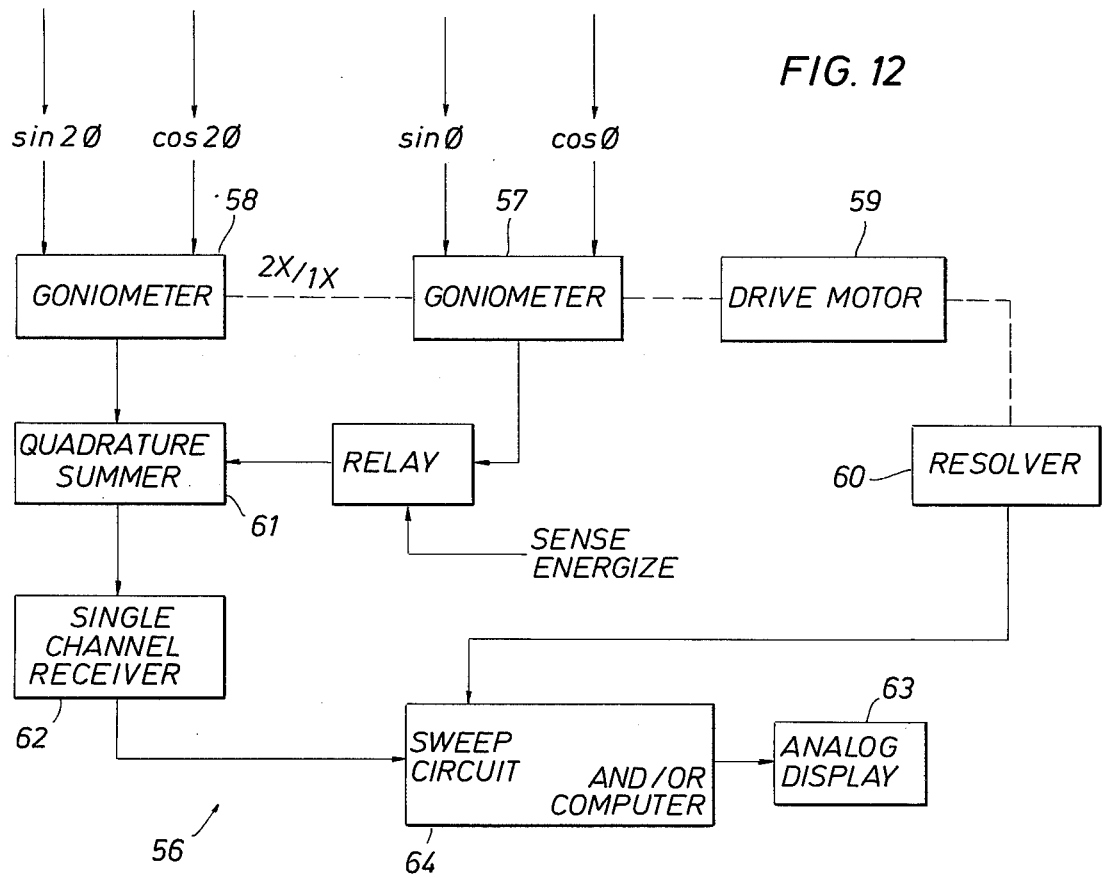
FIG. 12 is an alternative direction finding antenna system utilizing the antennas of FIG. 10.

FIG. 12 shows an alternative direction finding system 56. The two dipole Adcock antennas are connected to a goniometer 57, and the two quadrupole Adcock antennas are connected to a second goniometer 58. A drive motor 59 drives the movable element of both goniometers and resolver 60, and the outputs from the goniometers are provided to a quadrature summing circuit 61. The summing circuit is then connected to a signle channel receiver 62 and then to a display circuit 63 through a sweep circuit 64. The display circuit 63 forms an output indicating the direction or bearing of a particular target.

For a bandwidth of 5 or 6 to 1, the spacing of the antennas 51 and 52 is about 1.3 times the wavelength of the highest frequency of interest. This gives a spacing error of approximately 4.5° in this fixed antenna application. Spacing error is defined and can be calculated from the generalized antenna field equations. Spacing error represents a deviation in observed bearing from actual bearing. So long as the deviation is unambigious, the deviation can be corrected. However, the deviation becomes ambigious at a diametrical spacing of 2½ times the wave length. At this size of Adcock antenna system or greater, the deviation is both significant and ambigious. By contrast, a diametrical spacing of 1.3 times the wave length yields a maximum deviation of approximately 4.5°, which is also unambigious.

Figure 13:
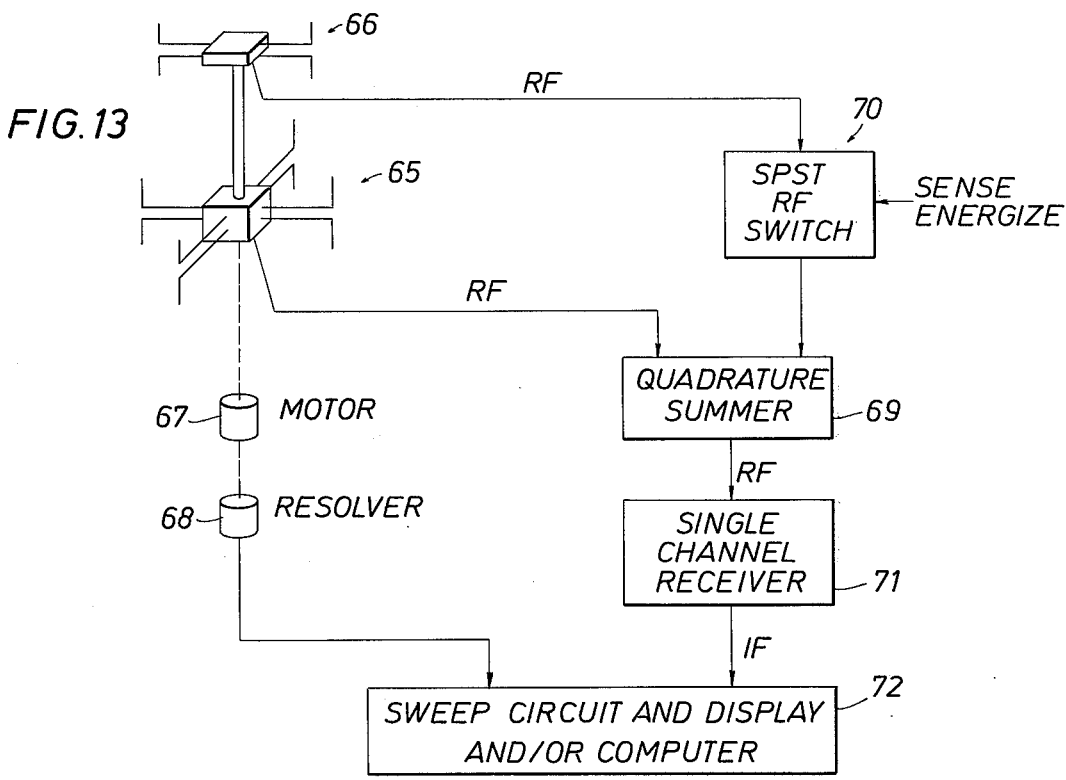
FIG. 13 is an alternate direction finding system using only one quadrupole Adcock antenna and one dipole Adcock antenna which are rotated together.

Another method if direction finding is shown in FIG. 13 which uses rotating antennas. The preferred embodiment uses one quadrupole Adcock 65 and one dipole Adcock antenna 66, or any quadrupole/dipole Adcock embodiment desired herein. The dipole antenna could be a dipole Adcock as shown in FIG. 13. The two antennas are rotated by a motor means 67 which is also coupled with a resolver 68. The RF output from the quadrupole Adcock goes directly to a quadruture summer 69 while the dipole output goes to the summer 69 through RF switch 70. The switch allows the dipole RF to be combined with quadrupole RF when sense resolution is desired to resolve the four way ambiguity of the quadrupole Adcock. The output from the quadrature summer 69 is applied to the input of single channel receiver 71. The output of receiver 71 and the output of resolver 68 are connected to the sweep circuit and display and/or computer indicated at 72.

This type of DF system has no spacing error and can be used up to the frequency where the quadrupole Adcock antenna has a diametrical spacing of 2½ times the wavelength of the observed transmitter, whereas, ambiguities occur at higher frequencies.

Figure 9:
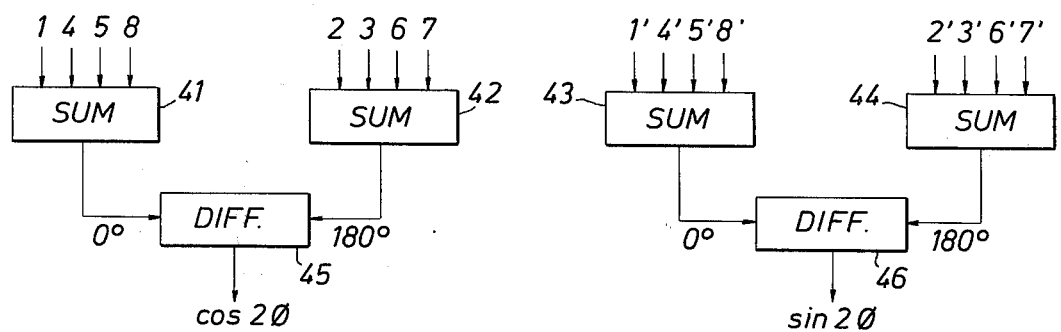
FIG. 9 schematically illustrates one manner of interconnection of the antenna system of FIG. 8.
Figure 14:
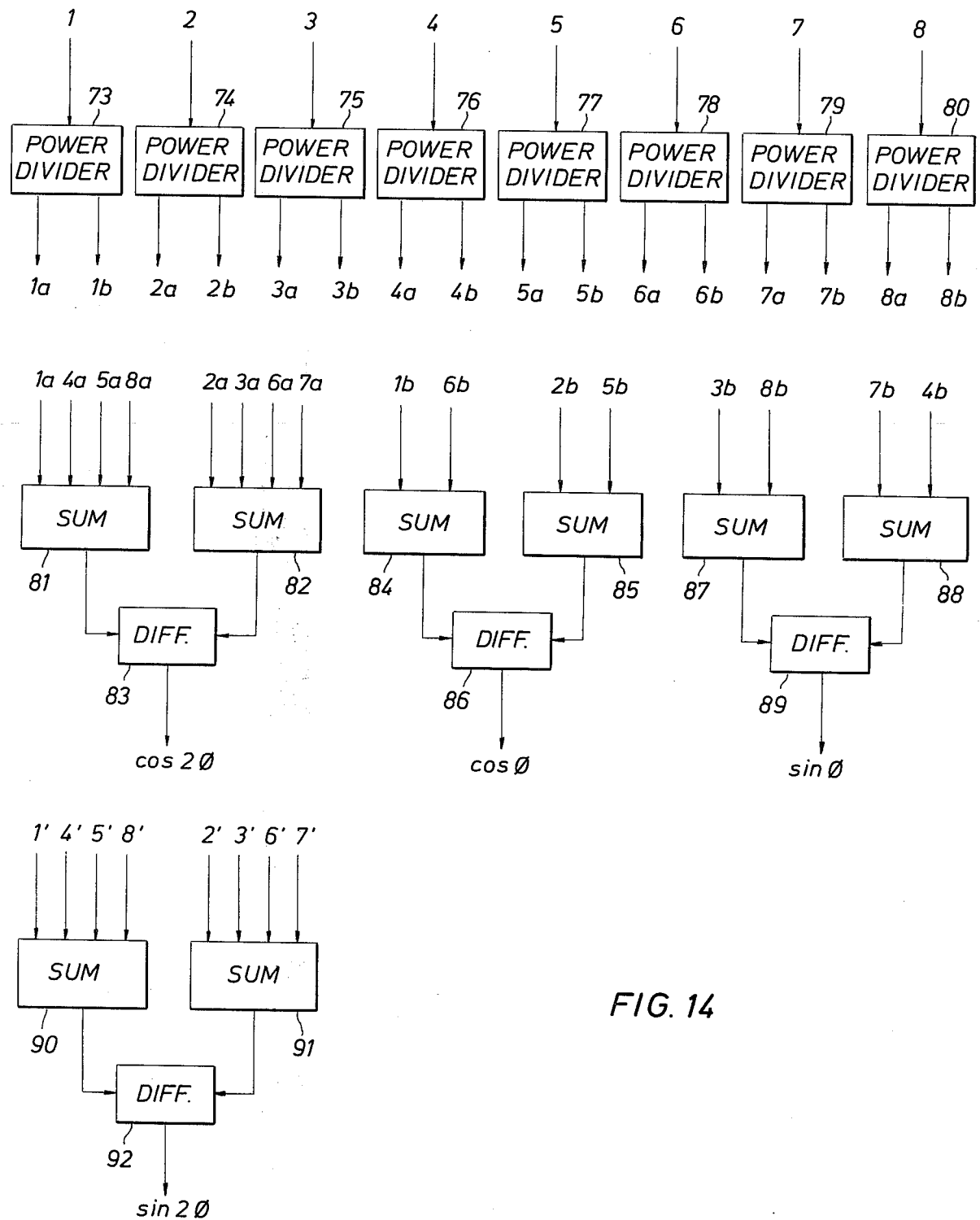
FIG. 14 is an alternate direction finding antenna system using only eight dipole elements arranged as shown in FIG. 8, for example, to obtain signals from the antenna which are a function of sin $2\phi$, cos $2\phi$, sin $\phi$ and cos $\phi$.

One of the quadrupole Adcock antenna functions and both of the dipole Adcock antenna functions can also be obtained simultaneously from a coplanar arrangement of four dipole elements as shown in FIG. 1. FIG. 14 shows the hybrid configuration where antennas 11, 12, 13 and 14 are fed to power dividers 73–80 which in turn are terminated in summers 81, 82, 84, 85, 87, and 88. The quadrupole Adcock function cos $2\phi$ is obtained at the difference transformer 83 output while the dipole Adcock functions cos $\phi$ and sin $\phi$ are obtained by difference transformers 86 and 89, respectively. Four additional dipole elements offset by 45° are required to obtain the remaining quadrupole Adcock function sin $2\phi$ as shown in FIG. 8 and FIG. 9. The power dividers 73–80 could be replaced by relays to provide a sequential (upon demand) antenna functional output. This hybrid arrangement eliminates the need for a separate dipole Adcock antenna system.

The scope of the present invention is determined by the claims which are appended hereto.

What is claimed is:

1. An antenna system comprising a plurality of dipole elements arranged as an electric field sampling antenna system, wherein output signals of said dipole elements are summed into two groups such that the signal difference of said two groups forms a quadrupole azimuth response.

2. The apparatus of claim 1 wherein matched network circuit means are connected to individual dipoles, and are also connected to a summing network circuit means to provide an antenna output signal.

3. The apparatus of claim 1 wherein the number of dipoles is four N where N is a whole positive integer.

4. The apparatus of claim 1 wherein four or more similar dipole elements are cross-connected with one another to provide two signal sums, and the signal difference of the two signal sums represents the quadrupole antenna output signal.

5. The apparatus of claim 1 wherein eight antenna elements are arranged as four vertically oriented dipoles with their respective centers in a common plane and located at 90° points around a central axis of the antenna system.

6. The apparatus of claim 1 wherein the antenna system forms an output signal given by $E = E_v \max \sin^3\theta \cos 2\phi$, where $\phi$ is the azimuthal angle, $\theta$ is the incidence angle, and $E_v$ is the vertical component of the incident signal.

7. The apparatus of claim 1 including a first and a second such antenna system which share a common electrical phase center and the second antenna system is offset from the first antenna system by a specified azimuth angle to define a direction finding system utilizing sin $2\phi$ and cos $2\phi$ signals formed by such antenna systems where $\phi$ is the azimuth angle.

8. The apparatus of claim 7 where said first and second antenna systems include a common electrical phase center and are azimuthally oriented 45° from one another.

9. The apparatus of claim 8 where said first and second antenna systems have their respective electrical phase centers separated.

10. The apparatus of claim 1 including four spaced, dipole antenna elements.

11. The apparatus of claim 10 wherein said dipole antenna elements are split at their respective midpoints and a conductor means is connected to each half of said elements, said conductor means being connected to a pair of summing circuits which form cumulative output signals which are then supplied to a difference circuit.

12. The apparatus of claim 10 wherein said dipole elements are arranged at 90° intervals about a reference axis.

13. The apparatus of claim 1 including four vertical dipole elements arranged at 0°, 90°, 180° and 270° with respect to a reference, and said dipoles are divided at their midpoints to define halves of the dipole elements and the halves are respectively denoted as 1 and 2, 3 and 4, 5 and 6, and 7 and 8, from top to bottom, and a summing circuit sums signals from the halves 1, 4, 5 and 8, and a second summing circuit sums signals from the halves 2, 3, 6 and 7, and a difference circuit is connected to both of said summing circuits and forms an output related to the difference therein.

14. The apparatus of claim 10 wherein the diametrical spacing of said dipole elements arranged in a square is up to 2½ times the longest wave length of interest.

15. The apparatus of claim 10 wherein said dipole elements are spaced at corners of a square.

16. The apparatus of claim 1 including four groups of two dipole elements each, said two dipole elements being connected and arranged in parallel sum.

17. The apparatus of claim 16 where said four groups are arranged at 90° intervals about a reference axis.

18. The apparatus of claim 17 wherein said four groups each have two output conductors which are connected in such a manner as to form a quadrupole Adcock antenna.

19. The apparatus of claim 1 including two such antenna systems arranged relative to a reference axis such that one forms output signals which are a function of $\cos 2\phi \sin^3 \theta$ and the other forms output signals which are a function of $\sin 2\phi \sin^3 \theta$ where $\phi$ to is the azimuth and $\theta$ is the incidence angle of a target of interest and said antenna systems respond passively to some broadcast from such target.

20. The apparatus of claim 19 including additional antenna means forming output signals which are a function of sine $\phi$ and cosine $\phi$.

21. The apparatus of claim 20 wherein four antenna systems have an electrical phase center separated vertically or horizontally and where the quadrupole antenna systems are azimuthally oriented 45° from one another and the dipole antenna systems are azimuthally oriented 90° from one another.

22. The apparatus of claim 19 including a direction finding display means operatively connected to said antenna means for forming an indication of such a target and its azimuth.

23. The apparatus of claim 19 including a goniometer means provided with the outputs thereof, and said means forms an indication of the bearing of such a target.

24. The apparatus of claim 20 including goniometer means provided with the signals which are a function of sine $2\phi$ and cosine $2\phi$, and a second goniometer means provided with the signals which are a function of sine $\phi$ and cosine $\phi$, and circuit means connected to both of said goniometer means for forming an indication of azimuth of such a target.

25. The apparatus of claim 24 wherein said circuit means includes a display means.

26. The apparatus of claim 19 including a dual channel receiver means provided with the antenna outputs thereof, and said means forms an indication of the bearing of such a target.

27. The apparatus of claim 26 including antenna sequencing relays provided with the signals which are a function of $\sin 2\phi$, $\cos 2\phi$, $\sin \phi$, and $\cos \phi$, and circuit means connected to said dual channel receiver means and logic sense detector means for forming an indication of the azimuth of such a target.

28. The apparatus of claim 27 where said circuit means includes a display means.

29. The apparatus of claim 1 including means for rotating said antenna system.

30. The apparatus of claim 29 including a generally vertical shaft on which said antenna system is supported and further including a motive means for rotating said shaft.

31. The apparatus of claim 29 including a dipole Adcock antenna cooperatively supported with parallel axis relative to said antenna system.

32. The apparatus of claim 30 including a dipole Adcock antenna mounted on said shaft.

33. The apparatus of claim 32 wherein said dipole Adcock antenna is azimuthally oriented wth respect to said antenna system.

34. The apparatus of claim 33 wherein said dipole Adcock antenna and said antenna system are connected to a summing means which is in turn connected to an amplifier means and to an output means.

35. The apparatus of claim 1 wherein said antenna system response to horizontally polarized radiation is substantially zero.

36. The apparatus of claim 1 wherein said antenna system includes vertical dipole elements.

37. The apparatus of claim 36 wherein said dipole elements are mounted and movable as a group.

38. An antenna system comprised of dipole elements which are constructed and arranged to form an output signal given by $E = E_{max} \sin^3 \theta \cos 2\phi$ Where $E_{max}$ = vertically polarized portion of incident radiation
$\theta$ = incidence angle
$\phi$ = azimuth angle 39. The apparatus of claim 1 including two such quadrupole antenna systems arranged relative to a referenced axis and connected to a summation and difference circuit means to provide $\sin 2\phi$, $\cos 2\phi$, $\sin \phi$, and $\cos \phi$ antenna functions where $\phi$ is the azimuth of a target of interest and said antenna systems respond passively to some broadcast from such a target.

* * * * *